US012444908B2

(12) United States Patent
Rockwell et al.

(10) Patent No.: US 12,444,908 B2
(45) Date of Patent: Oct. 14, 2025

(54) HIGH-BRIGHTNESS SPATIAL BEAM COMBINING OF LASER MODULES YIELDING A COMMON IMAGE PLANE

(71) Applicant: Raytheon Company, Waltham, MA (US)

(72) Inventors: David A. Rockwell, Culver City, CA (US); Fabio Di Teodoro, Hacienda Heights, CA (US); Marco A. Avila, McKinney, TX (US); Douglas W. Wolfe, La Habra Heights, CA (US)

(73) Assignee: Raytheon Company, Arlington, VA (US)

( * ) Notice: Subject to any disclaimer, the term of this patent is extended or adjusted under 35 U.S.C. 154(b) by 1156 days.

(21) Appl. No.: 17/304,234

(22) Filed: Jun. 16, 2021

(65) Prior Publication Data
US 2022/0407293 A1 Dec. 22, 2022

(51) Int. Cl.
*H01S 5/00* (2006.01)
*G02B 5/00* (2006.01)
*G02B 27/30* (2006.01)
*H01S 5/40* (2006.01)
*G02F 1/37* (2006.01)

(52) U.S. Cl.
CPC ............ *H01S 5/4025* (2013.01); *G02B 27/30* (2013.01); *H01S 5/0071* (2013.01); *H01S 5/0092* (2013.01); *G02B 5/001* (2013.01); *G02F 1/37* (2013.01)

(58) Field of Classification Search
CPC .... H01S 5/4025; H01S 5/0071; H01S 5/0092; H01S 5/005; H01S 5/4012; G02B 27/30; G02B 5/001; G02B 27/123; G02B 27/126; G02F 1/37
See application file for complete search history.

(56) References Cited

U.S. PATENT DOCUMENTS

| 4,977,562 | A * | 12/1990 | Welch ................. H01S 3/08004 372/98 |
| 6,005,717 | A | 12/1999 | Neuberger et al. |
| 6,337,410 | B2 | 1/2002 | Takesako et al. |
| 8,848,753 | B2 | 9/2014 | Koenning |
| 2003/0063884 | A1 * | 4/2003 | Smith ..................... H01S 3/063 385/129 |
| 2004/0252744 | A1 * | 12/2004 | Anikitchev ........ G02B 19/0028 372/100 |
| 2006/0153254 | A1 * | 7/2006 | Franjic ..................... G02F 1/39 372/30 |
| 2008/0019576 | A1 * | 1/2008 | Senftner ................. G06T 15/00 382/118 |
| 2009/0122272 | A1 * | 5/2009 | Silverstein ........... H04N 9/3161 353/20 |
| 2020/0006912 | A1 * | 1/2020 | Lancaster ............. H01S 3/0637 |

* cited by examiner

*Primary Examiner* — Xinning(Tom) Niu

(57) ABSTRACT

A system includes multiple laser diode modules that are spatially separated and configured to generate multiple optical beams that propagate at angles relative to each other. The system also includes an optical element having at least one entrance surface and at least one exit surface. The optical element is configured to receive the optical beams at the at least one entrance surface and output each optical beam through the at least one exit surface such that the output optical beams are closely spaced, substantially the same size, and substantially parallel to each other at a common distance downstream from the optical element, and the optical beams all share a common downstream image plane.

20 Claims, 10 Drawing Sheets

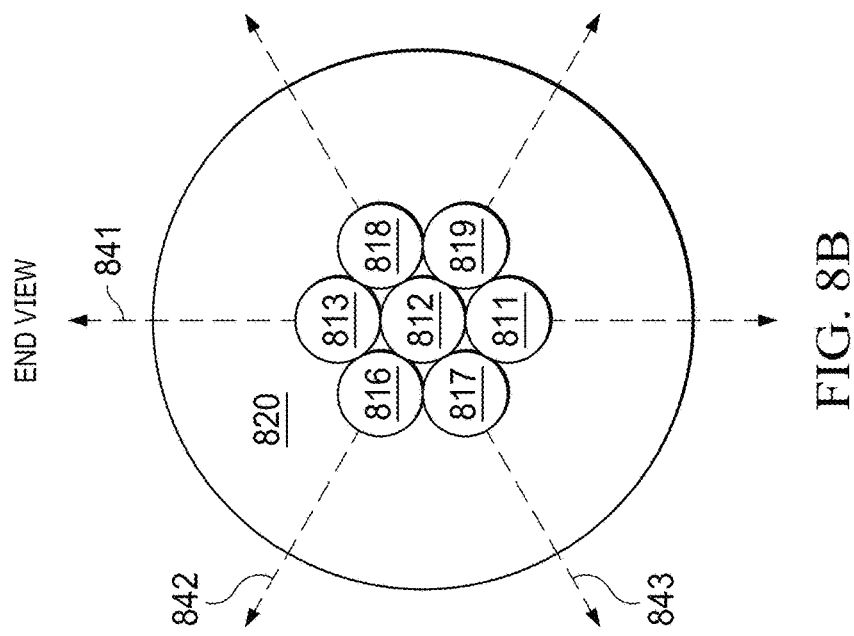
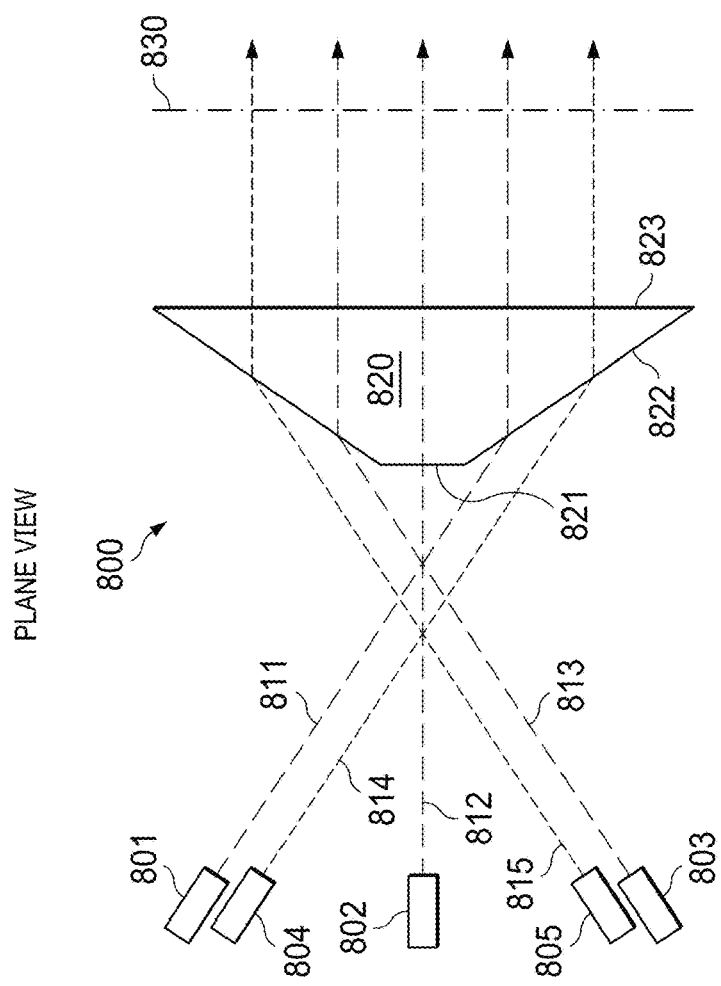
FIG. 8B
FIG. 8A

HIGH-BRIGHTNESS SPATIAL BEAM COMBINING OF LASER MODULES YIELDING A COMMON IMAGE PLANE

TECHNICAL FIELD

This disclosure is directed in general to optical systems. More specifically, this disclosure relates to high-brightness spatial beam combining of laser modules to yield a common image plane.

BACKGROUND

Laser module packages having multiple optical sources can be used to generate a source light for input to a laser medium. In these types of packages, the laser modules often have centimeter-scale transverse dimensions, and each source may produce a multi-mode optical beam having millimeter-scale dimensions. Objectives of such packages can include spatially combining the beams to produce an array of physically closely packed, adjacent, parallel beams and optically de-magnifying the beams (such as by a factor of ten or more) to match the size of a small target aperture that may be a pump aperture of a laser medium. Another objective can include ensuring the beams share a common final image plane coincident with the pump aperture with a precision that ensures very high coupling efficiency for all of the beams.

SUMMARY

This disclosure provides high-brightness spatial beam combining of laser modules to yield a common image plane.

In a first embodiment, a system includes multiple laser diode modules that are spatially separated and configured to generate multiple optical beams that propagate at angles relative to each other. The system also includes an optical element having at least one entrance surface and at least one exit surface. The optical element is configured to receive the optical beams at the at least one entrance surface and output each optical beam through the at least one exit surface such that the output optical beams are closely spaced, substantially the same size, and substantially parallel to each other at a common distance downstream from the optical element, and the optical beams all share a common downstream image plane.

In a second embodiment, a system includes multiple laser diode modules that are spatially separated and configured to generate multiple optical beams that propagate at angles relative to each other. The system also includes multiple first lenses arranged at angles relative to each other, each first lens configured to receive and focus one of the optical beams. The system further includes a second lens configured to receive the optical beams from the first lenses and output the optical beams such that the optical beams are closely spaced, substantially the same size, and substantially parallel to each other when exiting the second lens, and the optical beams all share a common downstream image plane.

In a third embodiment, a system includes multiple laser diode modules that are spatially separated and configured to generate multiple optical beams that propagate at angles relative to each other. The system also includes a reflector having multiple reflective facets, the reflector configured to receive and reflect each of the optical beams at a corresponding one of the reflective facets such that the optical beams are closely spaced and substantially parallel to each other when reflected from the reflector, and the optical beams all share a common downstream image plane.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 8A and 8B illustrate still another example system for high-brightness spatial beam combining of laser modules according to this disclosure.

DETAILED DESCRIPTION

Figure 1:
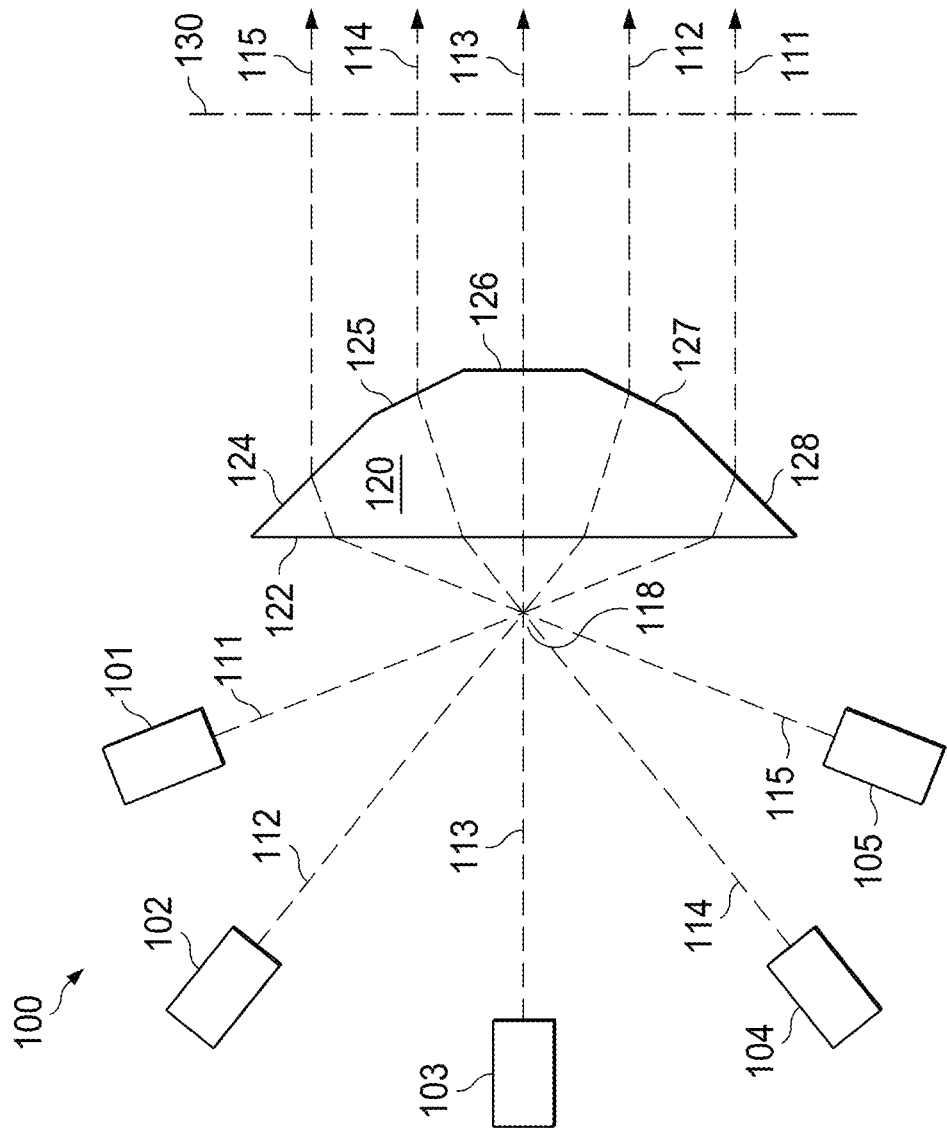
FIG. 1 illustrates an example system for high-brightness spatial beam combining of laser modules according to this disclosure.

FIGS. 1 through 9B, described below, and the various embodiments used to describe the principles of the present disclosure in this patent document are by way of illustration only and should not be construed in any way to limit the scope of the disclosure. Those skilled in the art will understand that the principles of the present disclosure may be implemented in any type of suitably arranged device or system.

For simplicity and clarity, some features and components are not explicitly shown in every figure, including those illustrated in connection with other figures. It will be understood that all features illustrated in the figures may be employed in any of the embodiments described. Omission of a feature or component from a particular figure is for purposes of simplicity and clarity and is not meant to imply that the feature or component cannot be employed in the embodiments described in connection with that figure. It will be understood that embodiments of this disclosure may include any one, more than one, or all of the features described here. Also, embodiments of this disclosure may additionally or alternatively include other features not listed here.

Systems that feature a one-dimensional (1-D) or two-dimensional (2-D) array of multi-mode diode laser beams at essentially the same wavelength present a number of challenges, particularly with respect to aligning the beams so that they are closely spaced in a 1-D or 2-D compact array and point in the same direction, such that all of the beams may be efficiently imaged and coupled into a small target aperture at a common image plane. In some systems, each beam is generated by a respective diode module and reflected off a respective mirror in such a way that the beams propagate in parallel toward a common image plane. However, the sizes of the mirrors, along with the fact that the mirror sizes must exceed the actual transverse dimensions of the respective beams by some minimum tolerance, establish a minimum spacing between the beams. Moreover, due to spacing requirements, the different diode modules are necessarily at different distances from the common image plane. Since the beams necessarily diverge as they propagate, the beam cross-sections at the target aperture at the common image plane will typically differ in size, which can be undesirable.

In principle, the difference in beam cross-sections can be eliminated by inserting optics into the beams' paths, where the optics are designed to place an image of the exit aperture of each of the diode modules at the common image plane. While this eliminates the variation in the beam cross-sections, the transverse dimensions of the lens mounts tend to further separate the beams from each other. Lens pairs can be inserted into the optical beam paths to create a downstream image of any beam, and the image can be highly precise, sharp, and limited only by diffraction effects. However, such images necessarily have a finite depth of focus along the propagation direction beyond which diffraction effects broaden out the beam.

In addition to the techniques described above, some systems use beam-bending prisms that convert a horizontal array of optical beams into a vertical array of optical beams. However, these systems do not use relay imaging to produce an image plane at which the beams have a well-defined intensity distribution that allow them to be closely packed in a linear array. Moreover, these systems do not minimize diffraction-induced beam spreading.

This disclosure provides various systems for high-brightness spatial beam combining of laser modules to yield a common image plane. The disclosed systems provide optical designs that can yield a close-spaced array of optical beams having a common image plane and common or different sizes, where the beams may be spaced only by the minimum required spatial tolerances in the image plane. As described below, multiple individual source packages are initially spread apart from each other, allowing ample space to avoid any physical interference between the optics and mounts for different beams. The beams are sized, collimated, and aligned to converge toward a single combining optical element. This convergence occurs downstream of the optics and mounts that would otherwise limit how closely spaced the beams may be. Each of the converging beams enters the combining optical element with a specific entry location and angle of incidence so that the beam passes through the combining optical element to form a crisp image at its respective exit surface with essentially no residual diffraction effects. The disclosed embodiments locate each beam closely adjacent to its neighboring beam(s) in a transverse dimension. In some embodiments, the orientations of the exit facets cause the beams to propagate substantially parallel to each other downstream of the combining optical element toward relay optics, which produce a crisp downstream image at a common image plane, which may be coincident with a small target aperture of a laser medium.

Although this disclosure describes various systems for high-brightness spatial beam combining of laser modules to yield a 1-D or 2-D close-packed array of optical beams that form a common image plane, the described embodiments focus on one-dimensional arrays for the purpose of simplicity and clarity; this focus is not meant to imply that any of the described design features or components do not apply to 2-D arrays. Those skilled in the art will understand that the principles described herein may be implemented in any type of suitably arranged 1-D or 2-D array of laser modules.

FIG. 1 illustrates an example system 100 for high-brightness spatial beam combining of laser modules according to this disclosure. As shown in FIG. 1, the system 100 includes multiple laser diode modules 101-105 each configured to respectively generate an optical beam 111-115 that propagates toward a multi-faceted prism 120. While five modules 101-105 and five beams 111-115 are shown in FIG. 1, other embodiments can include other numbers of modules and beams. Each module 101-105 is configured to generate a well-defined optical beam at an output aperture of the respective module 101-105. In some embodiments, each module 101-105 has a footprint that is approximately 5 centimeters by 4 centimeters, although other sizes are possible and within the scope of this disclosure. The modules 101-105 are spaced apart such that there is a relatively large amount of space between the modules 101-105 such that the modules 101-105 do not physically interfere with each other. In particular, the spacing between the modules 101-105 is at least as large as necessary to allow for any beam-positioning optics, imaging optics, or other components that might be placed around or between the modules 101-105 without impacting the packing density of the beams 111-115 at the exit surface of the prism 120 as described in greater detail below. The modules 101-105 are spatially arranged such that their respective optical beams 111-115 propagate at angles relative to each other. In the embodiment shown in FIG. 1, the beams 111-115 cross each other at a single point 118 before entering the prism 120. However, in other embodiments, at least some of the beams 111-115 may cross at different points or may be parallel or skew such that some beams 111-115 do not cross at all.

The prism 120 includes an entrance surface 122 at which the beams 111-115 enter the prism 120 and multiple exit facets 124-128. As shown in FIG. 1, each beam 111-115 is aligned to pass through the prism 120 and propagate through a different exit facet 124-128. In some embodiments, the beams 111-115 exit the prism 120 at approximately the center point of its respective exit facet 124-128. The prism 120 receives the beams 111-115 and causes different amounts of refraction on the beams 111-115 as the beams 111-115 propagate through the prism 120.

Downstream of the prism 120, the beams 111-115 propagate as a closely spaced 1-D array, substantially parallel to each other with substantially the same amount of diffraction relative to their respective exit facets such that they all may share a common downstream image plane. One effective means for assessing the qualities of this multiple-beam 1-D array would be to display this array on an observation screen or "reference plane" located just downstream of the prism. This reference plane does not perform any technical function in the present disclosure; it simply represents a straightforward approach for observing and assessing the quality of the combined-beam array. FIG. 1 shows that the beams 111-115 are substantially perpendicular to the reference plane 130, and also that they are substantially parallel and closely spaced to each other at the reference plane 130.

The function of the prism 120 can be better understood by considering a few representative beams. Consider the beam 113 that is incident on the prism 120 substantially perpendicular to the entrance surface 122 and that exits the prism 120 substantially perpendicular to the corresponding exit facet 126. Thus, the beam 113 simply passes through the prism 120 without much if any refraction or other changes in its propagation direction. In contrast, the beam 111 is incident on the prism 120 near an edge of the entrance surface 122. The beam 111 is at an angle relative to the entrance surface 122 and refracts as the beam 111 enters the prism 120. The beam 111 propagates through the prism 120 and refracts again as it exits the prism 120 at the exit facet 128 in a direction substantially parallel to the beam 113. Similarly, the beam 112 is incident on the prism 120 at an angle, passes through the prism 120, and refracts at the entrance surface 122 and at its exit facet 127 such that the beam 112 exits the prism 120 substantially parallel to the beams 111 and 113.

The modules 101-105 and the exit facets 124-128 are arranged relative to each other such that images of the output apertures of the modules 101-105 for the beams 111-115 are respectively relayed to the exit facets 124-128. Thus, each of the exit facets 124-128 provides a sharp image of its respective beam 111-115. The result is that the beam images, each on its respective exit facet 124-128, can be positioned immediately adjacent to each other, all within the same plane of incidence on the prism facets. This adjacency is maintained as the beams 111-115 leave the prism 120 and head toward their target beyond the reference plane 130, such as a small pump aperture of a laser amplifier.

Ideally, the beams 111-115 have substantially equal optical path lengths from their respective exit facets 124-128 to the common reference plane 130. In some embodiments, this condition may not be achieved exactly by the prism 120 alone. In those embodiments, a correction plate or other mechanism can be positioned downstream of the prism 120 to compensate for small differences in optical path lengths. Another approach is to reverse the prism 120 horizontally such that the entrance surface 122 becomes the exit surface for the beams 111-115 and the exit facets 124-128 become entrance facets. Since the "exit" surface 122 is flat, the beams 111-115 would automatically have equal distances to the downstream reference plane 130. In these embodiments, there might be some spatial overlap of the incoming beams 111-115 as they enter the prism 120 through the "entrance" facets 124-128, but the degree of overlap can be reduced or eliminated by increasing the distance between the beams. Use of a correction plate, a reversed prism 120, or any other optical-path-length compensation technique will be dependent on the details of the specific application.

Figure 2B:
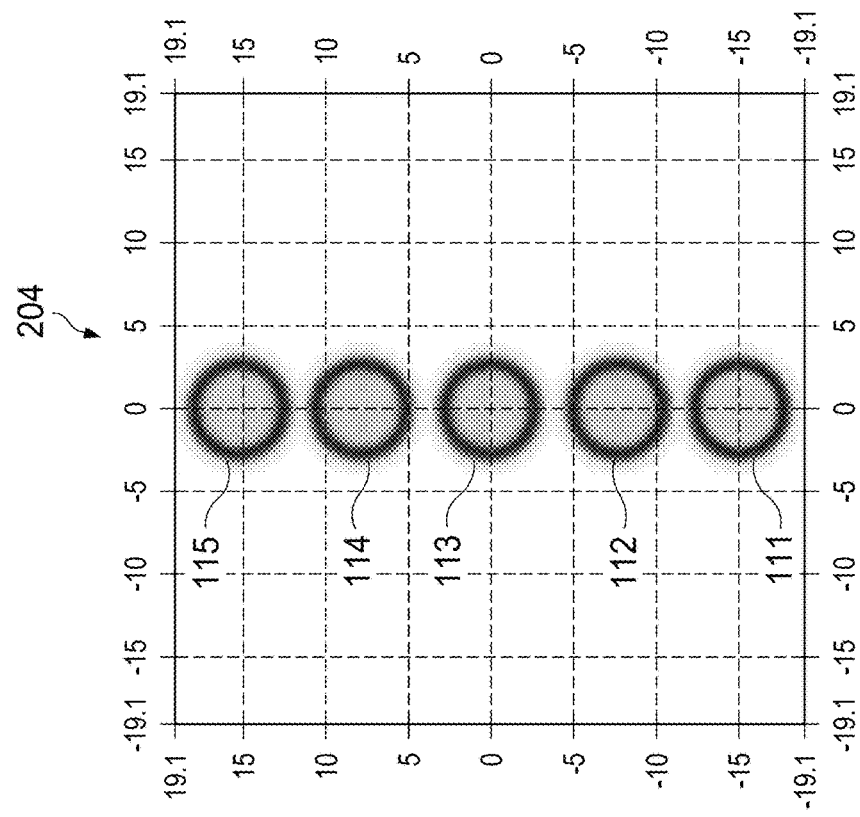
FIG. 2B shows an example view of images of beams at an image plane in the system of FIG. 1 according to this disclosure.
Figure 2A:
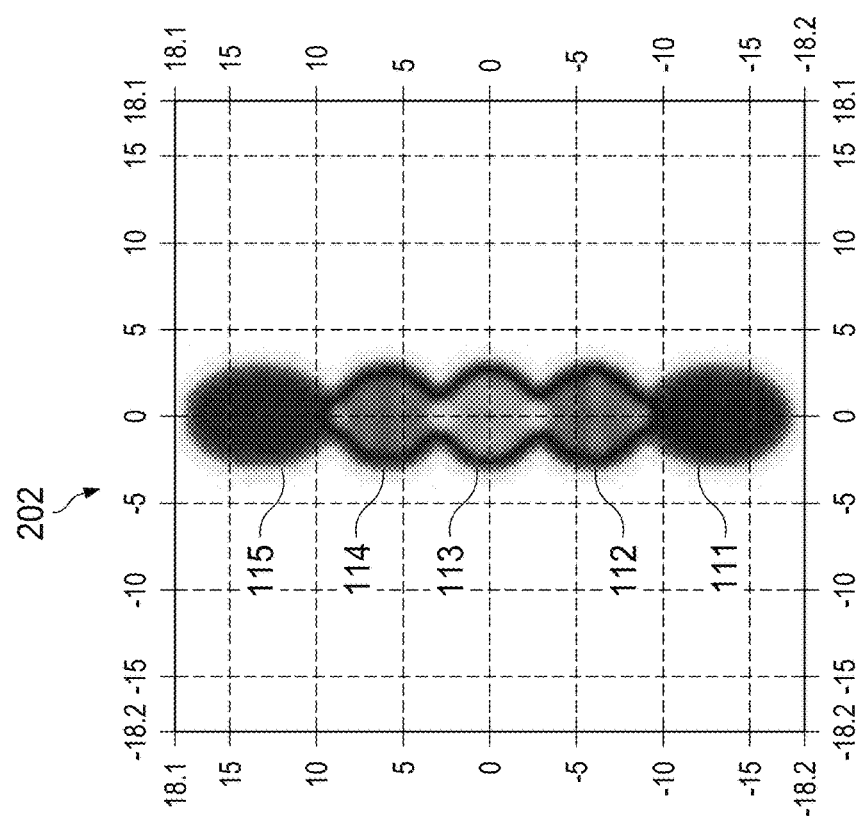
FIG. 2A shows an example view of images of beams at a prism entrance surface in the system of FIG. 1 according to this disclosure.

To illustrate these principles, FIG. 2A shows an example view 202 of images of the beams 111-115 at the entrance surface 122 of the prism 120. As shown in FIG. 2A, the images of the beams 111-115 exhibit different shapes due to the different angles of incidence of the beams 111-115 as they pass through the entrance surface 122. FIG. 2B shows an example view 204 of images of the beams 111-115 at the reference plane 130. As shown in FIG. 2B, the spatial intensity profile of each beam 111-115 is sharp and substantially the same size and shape as the others, and the beams 111-115 are closely spaced.

In some embodiments, one or more optical elements (not shown) can be installed downstream of the reference plane 130 to transfer a crisp image of the beams as they appear at their respective exit facets 124-128 downstream to the pump aperture of a laser (not shown). This can help to ensure that the crisp images of the beams at their facets 124-128 are reproduced at the pump aperture of a laser medium. The optical element(s) can also determine the final size of the beams 111-115 at the pump-cladding entrance, thereby ensuring efficient coupling of the beams 111-115 into the small pump aperture of the laser medium.

Figure 3:
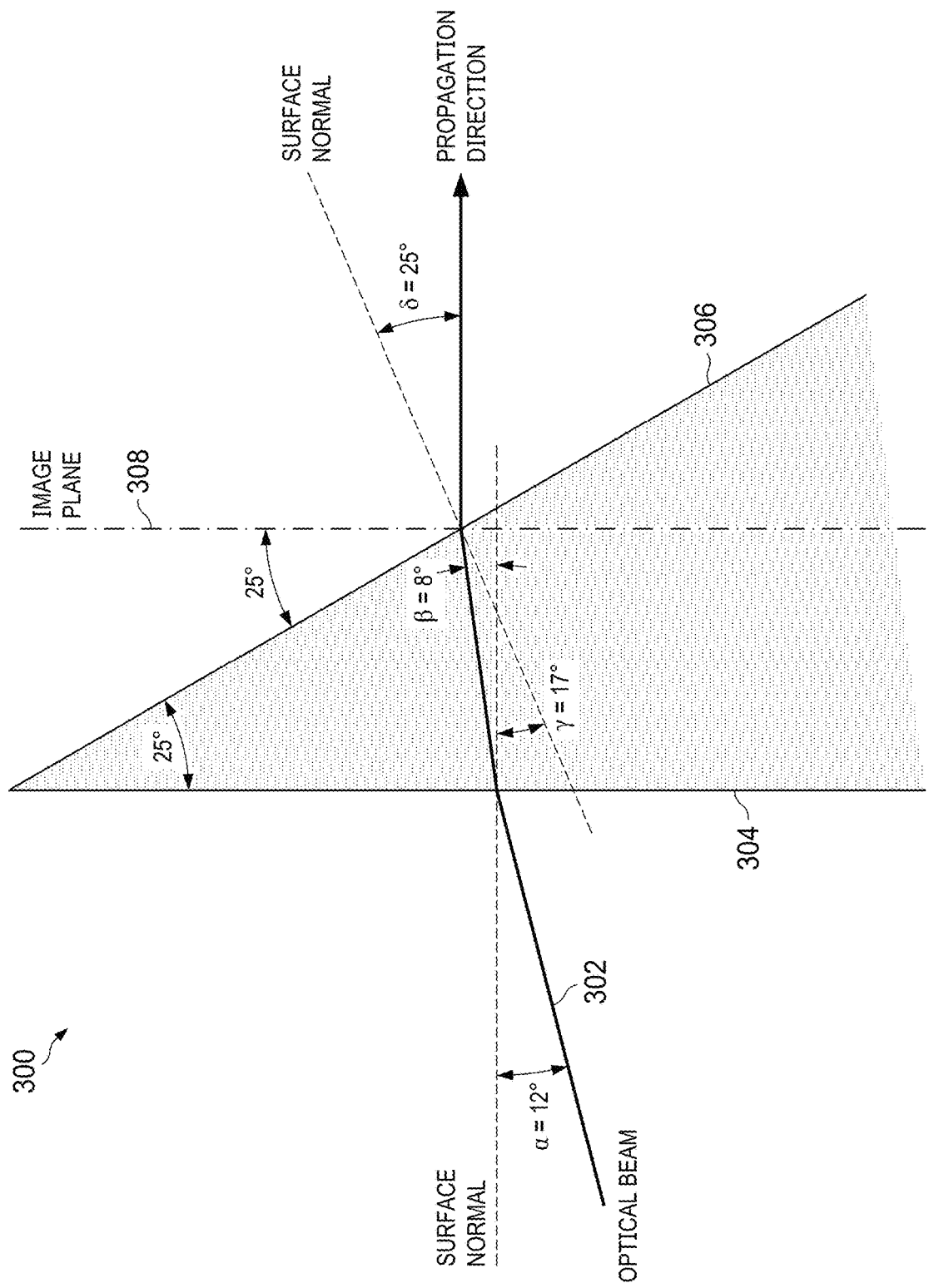
FIG. 3 illustrates details of an example of a single facet of the multi-faceted prism according to this disclosure.

FIG. 3 illustrates details of a single facet as an example of the multi-faceted prism 300 according to this disclosure. The prism 300 of FIG. 3 may, for example, represent the prism 120 of FIG. 1. As shown in FIG. 3, a beam 302 passes through the prism 300, where the beam 302 may represent one of the beams 111-115 of FIG. 1. The prism 300 includes an entrance surface 304 and an exit surface 306. The entrance surface 304 is substantially parallel to a reference plane 308. In embodiments with multiple beams (such as the system 100 of FIG. 1), one purpose of the prism 300 can be to help ensure that the beams are substantially perpendicular to the reference plane 308 and substantially parallel to each other as they leave the prism 300.

In FIG. 3, the prism surfaces 304 and 306 intersect each other at an angle that is selected to ensure that the incident beam 302 exits the prism 300 at a direction substantially perpendicular to the reference plane 308. Assuming the angle of incidence of the beam 302 is $\alpha=12°$ (which depends on the specific location of the diode module generating the beam 302) and the refractive index of the prism 300 is 1.45, application of Snell's Law at the entrance surface 304 shows that the beam 302 propagates into the prism 300 at an angle of refraction $\beta=8°$ and then propagates across the wedge of the prism 300. Applying Snell's Law again at the exit surface 306 and requiring that the exiting beam 302 be substantially perpendicular to the reference plane 308 leads to a prism angle of 25°. The angle of 25° provides an angle of incidence $\gamma=17°$ on the exit surface 306, which yields a final output beam 302 propagating at an angle $\gamma=25°$ relative to the normal of the exit surface 306. This propagation direction compensates for the prism angle of 25° such that the beam 302 propagates substantially perpendicular to the reference plane 308 when the beam 302 exits the prism 300.

Note that FIG. 3 illustrates one specific example of an angle of incidence on the flat entrance surface 304, which can represent the entrance surface 122 of the prism 120 of FIG. 1. The principles described in conjunction with FIG. 3 can be applied to the configuration of the system 100 of FIG. 1. Since the system 100 includes multiple beams 111-115, each of the beams 111-115 has a specific angle of incidence on the planar entrance surface 122, which depends on the location of its corresponding module 101-105. In the prism 300, the angle between the entrance surface 122 and the corresponding exit facet 124-128 for each beam path is selected as described in FIG. 3 such that each beam 111-115 is substantially perpendicular to the reference plane 130 when the beam 111-115 leaves the prism 120. That is, by applying the principles described in conjunction with FIG. 3 on the prism 120 and assuming five beams 111-115 arranged as shown, the resulting prism 120 has the shape schematically indicated in FIG. 1. This same design technique can be adapted to define the relevant facet angles for any number of modules 101-105 and beams 111-115.

It is noted that the planar entrance surface 122 of the prism 120 is flat, so any diffractive spreading that might exist on any of the beams 111-115 as they pass through the entrance surface 122 has little or no impact on the beams 111-115. Since there are no nearby apertures, there is no risk of overfilling any apertures or the associated propagation losses that would arise from related diffraction effects. Also, the only apertures that exist are defined by the facet-to-facet interfaces between adjacent exit facets 124-128. The design of the system 100 specifies that the image of each beam 111-115 is placed at its respective exit facet 124-128 so that, to the lowest order, there is no overfill of the exit-facet apertures.

It is also noted that there may be a possibility that the size of each beam 111-115 could change due to the fact that the beam size in the plane of incidence can expand slightly when passing from a higher-index medium into a lower-index medium. However, this effect is reversible by correct selection of prism angles. In general, for a selected orientation of a glass or other prism relative to a beam passing completely through the prism, the beam size increase upon entering the prism can be partially compensated by the size reduction upon exiting the prism. Indeed, if the design of the prism is such that the incident and exiting angles are the same such that the beam passes symmetrically through the prism, the compensation can be total. The degree of increasing or decreasing of the beam size depends on the angle of incidence relative to the surfaces of the refracting medium and also the refractive index of the medium.

While it is clear that a symmetric arrangement, where the angles of incidence and refraction are the same at both surfaces 304 and 306, ensures that the net change in the transverse dimension of the beam 302 is substantially zero, this is not the case with FIG. 3. This situation is consistent with the fact that, in some embodiments, it may be preferable or required for the beam 302 to expand or contract as it passes through the prism 300. The optical design considerations described here can accommodate such requirements by deriving alternative specifications for the initial incident angle on the entrance surface 304 and the prism angle of the prism 300, which would also result in a change to the incident angle on the surface 306.

Figure 4:
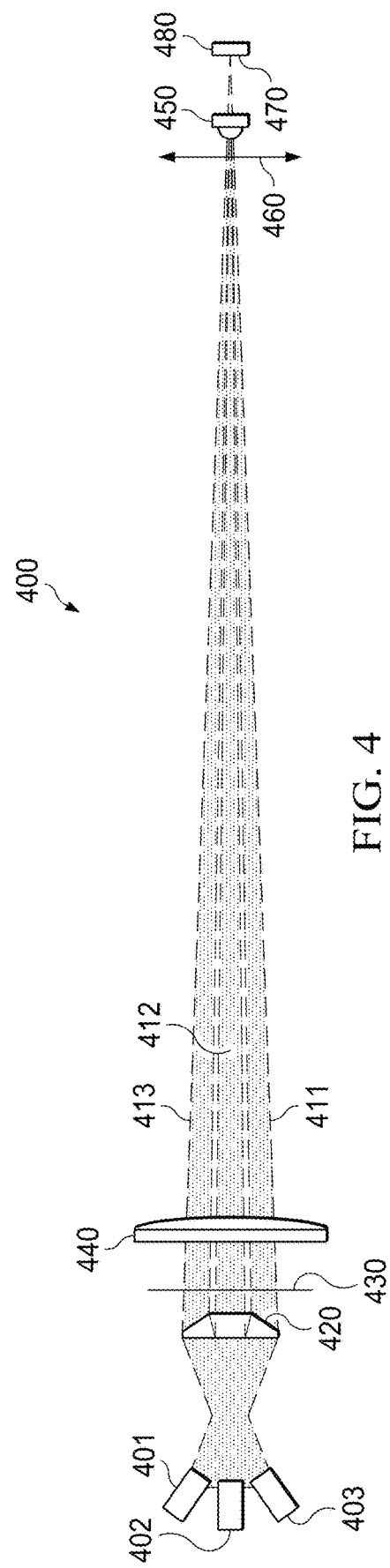
FIG. 4 illustrates an example system for high-brightness spatial beam combining of laser modules using relay imaging according to this disclosure.

FIGS. 4 and 5A through 5D illustrate an example system 400 for integrating the high-brightness spatial beam combined laser modules with relay-imaging optics according to this disclosure. In particular, FIG. 4 illustrates the system 400, and FIGS. 5A through 5D illustrate various views 501-504 of beam images at different locations in the system 400. As discussed below, multiple components of the system 400 may be the same as or similar to corresponding components of the system 100.

Figure 5B:
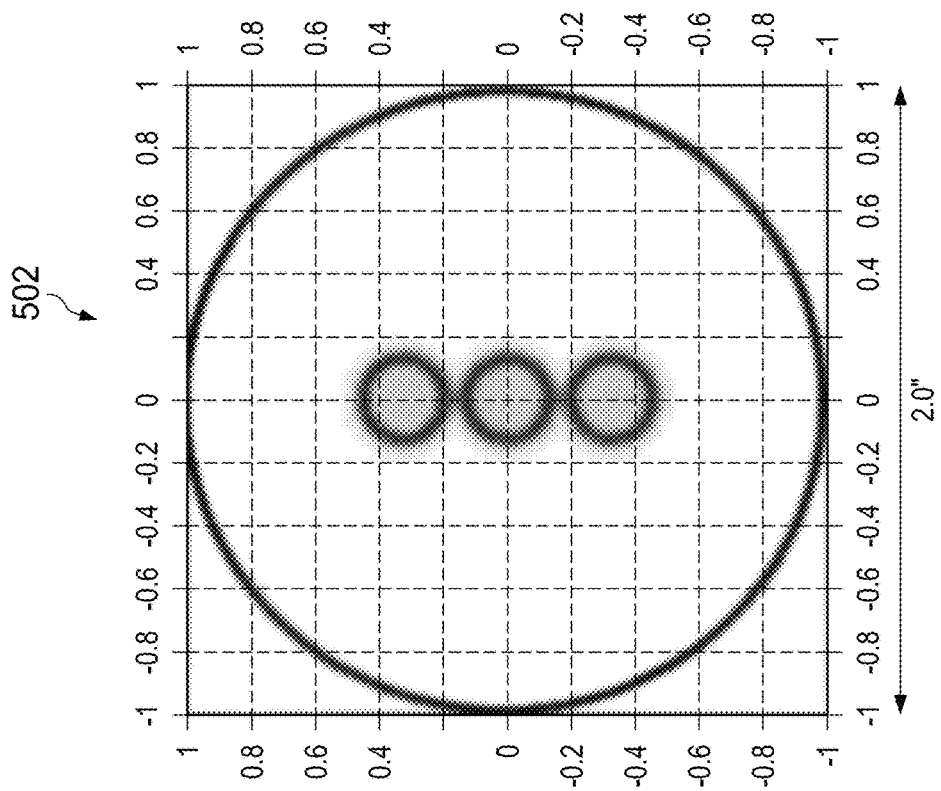
FIGS. 5A through 5D illustrate various views of beam images at different locations in the system of FIG. 4 according to this disclosure.
Figure 5A:
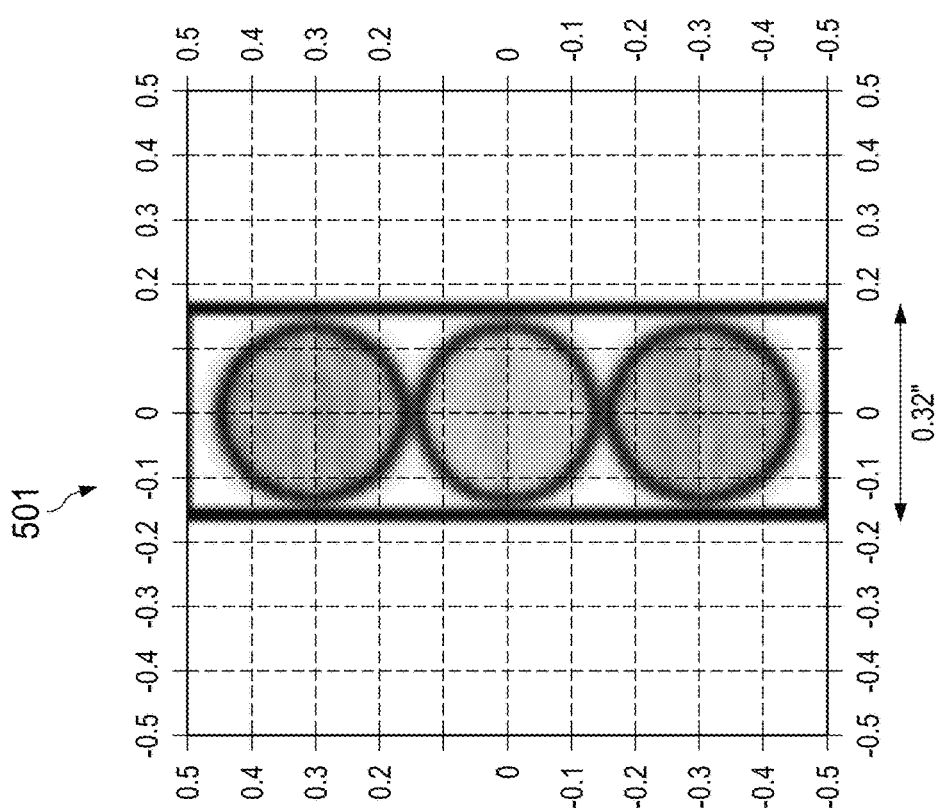

As shown in FIG. 4, the system 400 includes three laser diode modules 401-403. The modules 401-403 may be the same or similar to the modules 101-105 of FIG. 1. The modules 401-403 are spaced apart adequately such that the modules 401-403 do not physically interfere with each other. Each module 401-403 is configured to generate an optical beam 411-413 that propagates toward a three-faceted prism 420. FIG. 5A shows the view 501 of the beams 411-413 at the entrance face of the prism 420. In this embodiment, the beams 411-413 each have a diameter of approximately 6.35 millimeters. Of course, this is merely one example, and other embodiments may include beams having other sizes.

The prism 420 operates to refract and transmit the beams 411-413 in the same or similar manner as the prism 120 of FIG. 1 such that, at a reference plane 430, the beams 411-413 are substantially parallel to each other, substantially perpendicular to the reference plane 430, they are closely spaced, and are substantially the same size. As used herein, "closely spaced" can refer to beams whose center points are spaced approximately 1.0-1.5 beam diameters apart. The beams 411-413 are directed to a relay lens 440. In FIG. 5B, the view 502 illustrates the beams 411-413 at the front face of the relay lens 440. The image of the beams 411-413 in FIG. 5B is substantially the same as the image of the beams 411-413 in FIG. 5A, but the scale of the views 501-502 is different. The relay lens 440 focuses the beams 411-413 to another relay lens 450, which forms a relay lens pair with the relay lens 440. The relay lens 450 may have the same focal plane as the relay lens 440 as indicated by the arrow 460. The focal length of the relay lens 440 may be approximately forty times the focal length of the relay lens 450. The relay lens 450 outputs the beams 411-413 to an image plane 470, which may coincide with a beam input 480, such as a pump aperture of a laser gain medium or a pump aperture of a nonlinear optical medium (e.g., a high-aspect ratio crystal for nonlinear optical wavelength conversion, such as second-harmonic generation).

Figure 5D:
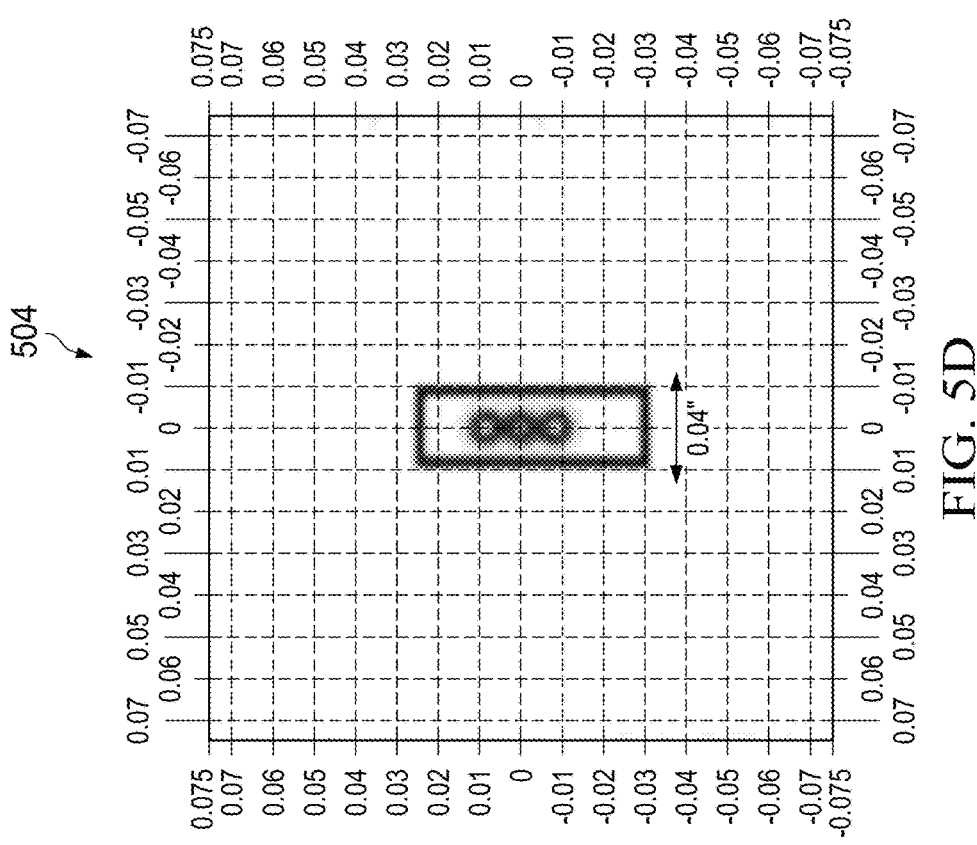
Figure 5C:
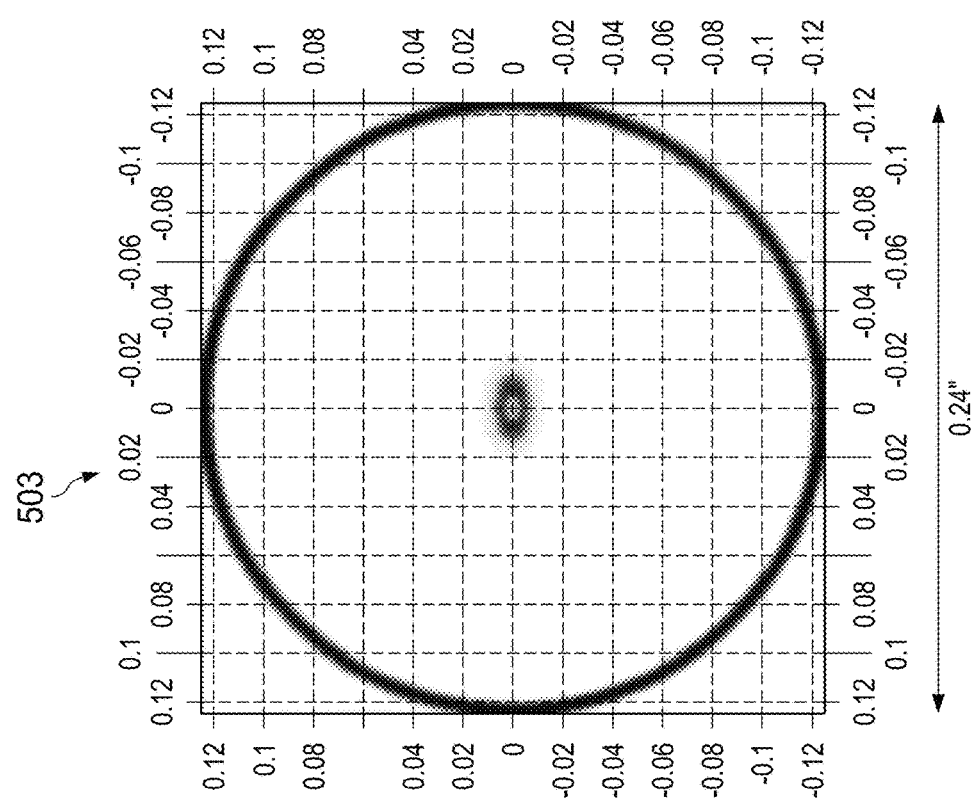

The size(s) of the beams may be reduced by the two relay lenses 440 and 450 by a factor equal to the ratio of the two focal lengths, such as about forty times. In FIG. 5C, the view 503 shows the beams 411-413 at the front face of the relay lens 450. In the view 503, the beams 411-413 are not distinct and are much smaller than the 6.35 millimeter reference window. The relay lens 450 sharpens the beams 411-413 such that, at their common image plane 470, which may be a pump aperture of a laser medium, the beams 411-413 are distinct and sharp. In FIG. 5D, the view 504 shows the beams 411-413 at the image plane 470. Here, each beam 411-413 has a diameter of approximately 0.1778 millimeters, which is about one-fortieth of the size of the beams 411-413 in the view 501.

The following discussion illustrates the use of the relay imaging shown in FIG. 4. Due to optical diffraction, the image of any object evolves as the distance from the object increases. A sharp intensity profile that is formed very close to an object, where essentially no diffraction has occurred, is called a near-field image. An intensity profile that is formed very far from an object, where significant diffraction has occurred, is called a far-field profile. A far-field profile can also be produced at an observation plane physically close to an object if the observation plane is located at the focal plane of a lens.

From a mathematical perspective, a far-field image is a Fourier transform of the corresponding near-field image. This means that the spatial distribution of light in the far-field image represents the spatial-frequency content of the near-field image. Low spatial frequencies are represented by light intensity near the center of the far-field image, while high spatial frequencies are represented by light intensity further away from the center of the far-field image. For example, any very sharp, crisp element of a near-field image necessarily requires the presence of many high-spatial frequencies, and this tends to produce a spatially broad far-field image.

This relative spatial spreading of the far-field image can make it difficult to produce a very small beam that can be launched into very small apertures that may be located at a focal plane of a lens. However, in the vicinity of the far-field image produced at the focal plane of a lens, there exists another observation plane that has the same spatial distribution as the original near-field image, but scaled to a larger or smaller absolute size depending on the focal lengths and spacings of the optics between the original object and the observation plane. It is this relayed near-field image that can be launched into the pump aperture of the laser medium. For example, the view 504 of FIG. 5D shows such a relayed near-field image at the image plane 470 that is generated by the relay lenses 440 and 450 and is about forty times smaller than the initial near-field image at the reference plane 430.

Figure 6A:
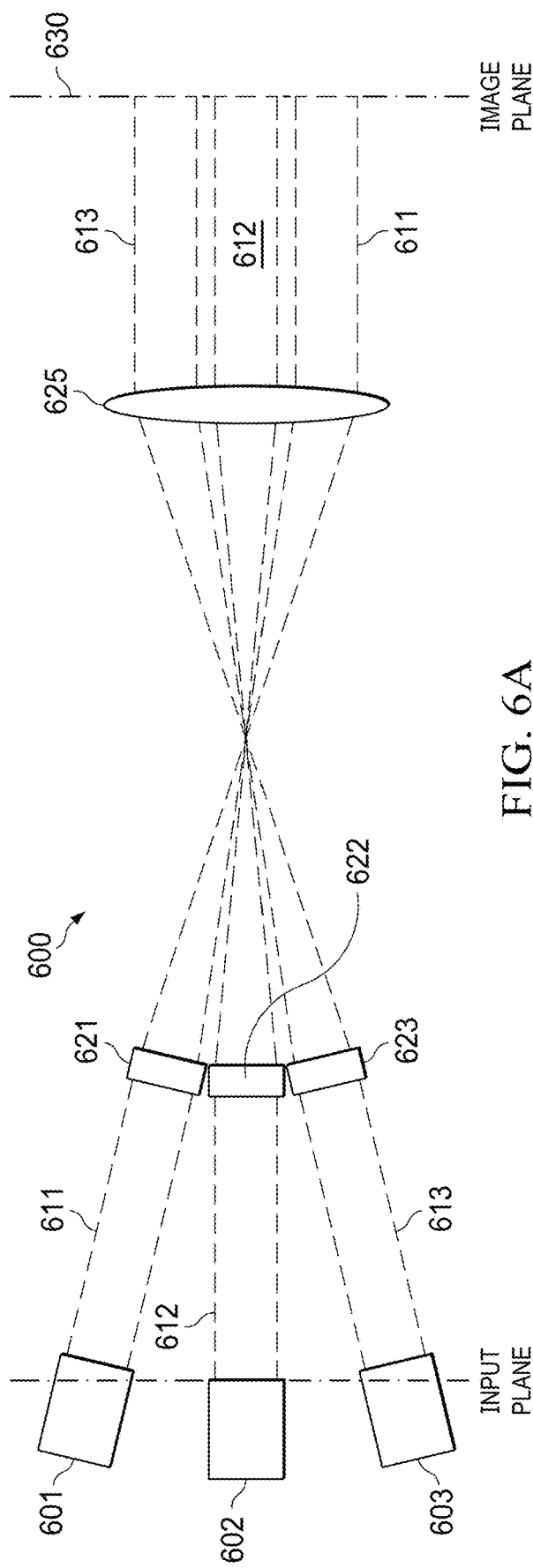
FIG. 6A illustrates another example system for high-brightness spatial beam combining of laser modules according to this disclosure.

FIG. 6A illustrates another example system 600 for high-brightness spatial beam combining of laser modules according to this disclosure. As discussed below, multiple components of the system 600 may be the same as or similar to corresponding components of the system 100. As shown in FIG. 6A, the system 600 includes multiple laser diode modules 601-603 that generate multiple optical beams 611-613. The modules 601-603 and the beams 611-613 may be the same as or similar to the modules 101-105 and the beams 111-115 of FIG. 1.

Figure 6B:
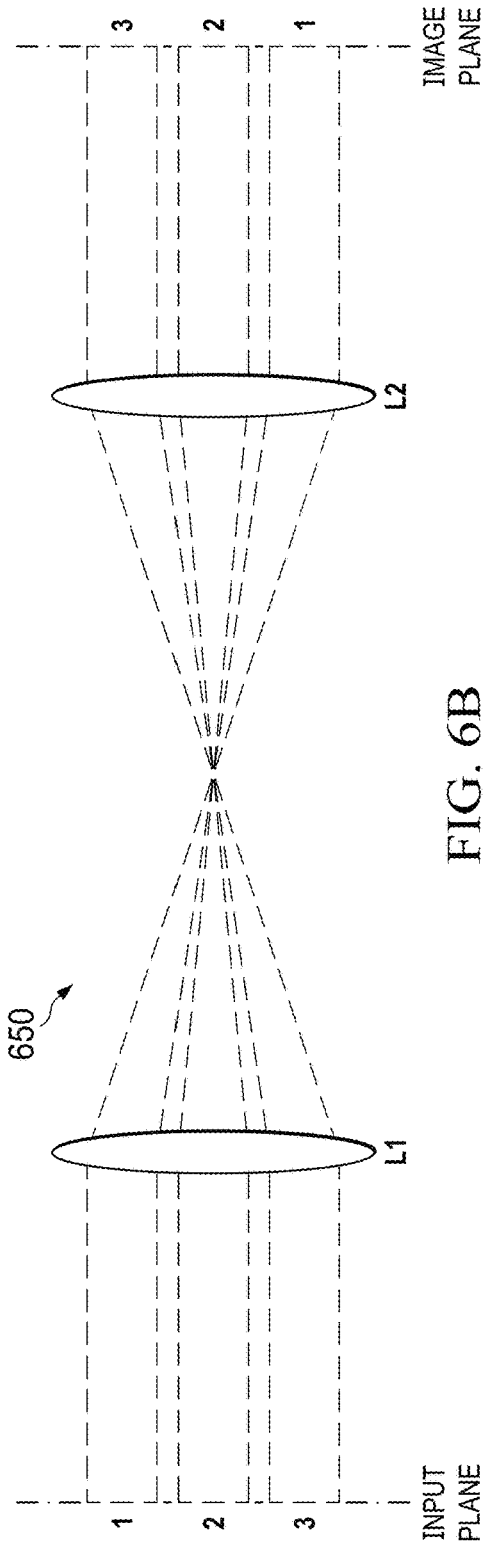
FIG. 6B illustrates a typical optical imaging system.

The system 600 also includes multiple first lenses 621-623 arranged at an angle relative to each other and a second lens 625 downstream from the first lenses 621-623. Unlike the system 100 that uses the wedge-shape prism 120 to control beam direction, the system 600 achieves the same objective using the lenses 621-623 and 625. The principles of the system 600 can be understood by considering a typical optical imaging system 650 as shown in FIG. 6B. In the system 650, two lenses L1 and L2 are assumed to have equal focal lengths and are assumed to be separated by twice their focal length to yield a ix image of the input plane at the image plane. Of course, other focal-length ratios and inter-lens spacings are possible. For example, various levels of magnification or de-magnification can be produced depending on the lens focal lengths, spacings, and the distances of the actual objects from the input lens L1.

In FIG. 6A, the system 600 is based on modifications to the optical imaging system 650 of FIG. 6B. Instead of a single lens L1 that receives multiple beams, the system 600 includes the multiple lenses 621-623, each of which focuses only a single beam 611-613. Downstream from the lenses 621-623, each of the beams 611-613 propagates the same as or similar to the corresponding beam in the system 650. In particular, the beams 611-613 are output from the lenses 621-623 to the second lens 625, which outputs the beams 611-613 toward a reference plane 630. Therefore, the beams 611-613 are observed at the reference plane 630 to have the same magnification. However, in the system 600, the three beams 611-613 are arranged to propagate at angles relative to each other, consistent with the angular arrangement of the modules 601-603. Similarly, the lenses 621-623 are arranged at angles relative to each other. These angles can be defined over a wide parameter space by appropriate optical design. In some embodiments, the angles between the lenses 621-623 are substantially equal to the angles between the modules 601-603. Thus, the beams 611-613 are incident on the lenses 621-623 substantially perpendicular to the entrance surfaces of the lenses 621-623.

One possible benefit of this configuration is that the respective modules 601-603 can be located at convenient distances from each other without affecting the relative spacing and propagation directions of their respective optical beams 611-613 at the reference plane 630 and beyond. For example, since the magnification of the imaging depends on the ratio of the focal lengths of the lenses 621-623 to the focal length of the lens 625, the absolute focal lengths can be specified over a wide range to provide the required space between the modules 601-603 and their associated optics while maintaining a constant magnification, which can be selected to optimize the optical propagation and launch into an optical fiber downstream from the reference plane 630. As in the system 100, the beams 611-613 in the system 600 are substantially the same size and shape at the reference plane 630. Depending on the sizes and numbers of beams, the lenses 621-623 may be simple spherical lenses. However, in other embodiments, the lenses 621-623 can be customized aspherical lenses that minimize any aberrations.

The system 600 is also advantageous due to the fact that the total end-to-end optical path length is nominally the same for all beams 611-613, so that the downstream beam sizes are substantially the same at the reference plane 630. Hence, the system 600 does not require a correction plate. If necessary, the downstream position of each image can be translated longitudinally by translating the respective module 601-603. For unity magnification, a module 601-603 and its corresponding image move at the same rate. The total object-to-image distance for non-unity imaging depends on the distance of the object from the lens 621-623 and the degree of magnification or de-magnification. In either case, the image position can be fine-tuned such that the images of the beams 611-613 can be co-aligned to lie in a single reference plane 630. Downstream from the reference plane 630, the principles of relay imaging described in FIG. 4 can be used in conjunction with the system 600.

Figure 7:
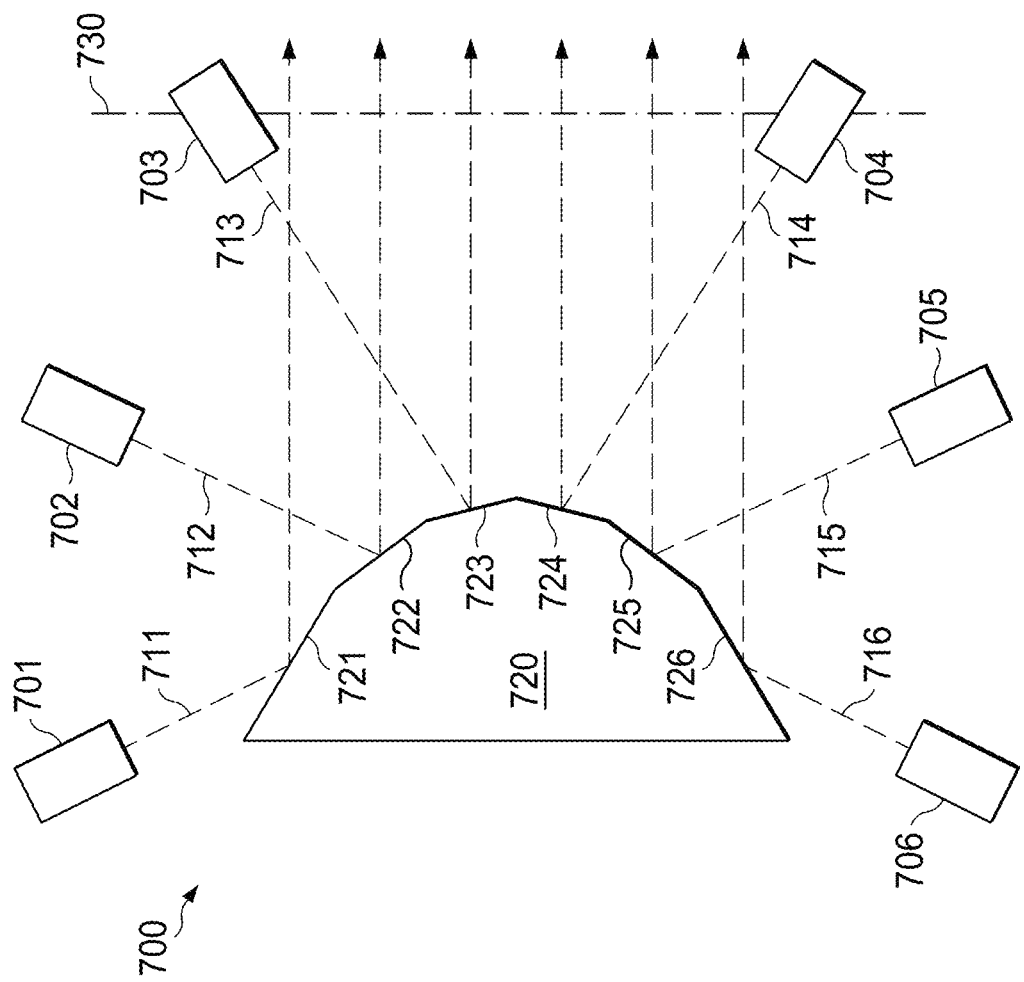
FIG. 7 illustrates yet another example system for high-brightness spatial beam combining of laser modules according to this disclosure.

FIG. 7 illustrates yet another example system 700 for high-brightness spatial beam combining of laser modules according to this disclosure. As discussed below, multiple components of the system 700 may be the same as or similar to corresponding components of the system 100. As shown in FIG. 7, the system 700 includes multiple laser diode modules 701-706 that generate multiple beams 711-716. The modules 701-706 and the beams 711-716 may be the same as or similar to the modules 101-105 and the beams 111-115 of FIG. 1. Instead of the refracting prism 120 of FIG. 1, the system 700 includes a multi-faceted reflector 720. The reflector 720 includes a distinct reflective facet 721-726 for each beam 711-716. In the system 700, the beams 711-716 are output from the modules 701-706 toward a corresponding reflective facet 721-726 of the reflector 720. Each reflective facet 721-726 has a reflective exterior surface and reflects the corresponding beam 711-716 toward a common reference plane 730. As shown in FIG. 7, after being reflected, the beams 711-716 are arranged into a linear array of closely packed, substantially parallel beams that are substantially perpendicular to the reference plane 730. The arrangement and angles of the reflective facets 721-726 are selected based on the arrangement and angles of the modules 701-706 such that the beams 711-716 are substantially parallel at the reference plane 730. As in the system 100, the beams 711-716 in the system 700 are substantially the same size and shape at the reference plane 730. Downstream from the reference plane 730, the principles of relay imaging described in FIG. 4 can be used in conjunction with the system 700.

One possible advantageous feature of the reflective design of the system 700 is that there are no changes in the individual-beam aspect ratios, which are possible with a refractive design. On the other hand, with the refractive design, an angular error in the angle of incidence essentially prints through the entire beam path to yield a comparable error in the output beam array, while an analogous angular error with the reflective design is doubled in the final output beam. There are also differences in packaging strategy and other implementation details. However, such differences are not fundamental and are all within the scope of this disclosure.

As with the refractive system 100 of FIG. 1, a correction plate (not shown) or other mechanism can be inserted in the system 700 between the reflector 720 and the reference plane 730 to equalize the path lengths from the modules 701-706 to the reference plane 730. Extending the principles of the system 700 to a limit of a spatially dense array of optical beams generated by a large number of diode modules, the dimensions of the individual facets of the reflector 720 would become smaller, and the reflector 720 would evolve into a convex reflector.

FIGS. 8A and 8B illustrate still another example system 800 for high-brightness spatial beam combining of laser modules according to this disclosure. As discussed below, multiple components of the system 800 may be the same as or similar to corresponding components of the system 100. As shown in FIGS. 8A and 8B, the system 800 includes multiple laser diode modules 801-805 that generate multiple beams 811-815. The modules 801-805 and the beams 811-815 may be the same as, or similar to, the modules 101-105 and the beams 111-115 of FIG. 1.

Instead of the refracting prism 120 of FIG. 1, the system 800 includes an axicon 820, which is a type of optical element that has a conical surface. In the system 800, the axicon 820 is formed similar to a truncated cone and has a flat entrance surface 821, a conical surface 822, and a flat exit surface 823. In describing this figure, we first consider only diode modules 801-803 that generate multiple beams 811-813. In one aspect of operation, the beams 811-813 are output from the modules 801-803 toward the axicon 820. The beam 812 reaches the axicon 820 substantially perpendicular to the entrance surface 821, is incident on the entrance surface 821, and exits the axicon 820 substantially perpendicular to the exit surface 823. Thus, the beam 812 simply passes through the axicon 820 without much if any refraction or other changes in its propagation direction. The other beams 811 and 813 are incident on different portions of the conical surface 822. Each of the beams 811 and 813 is at an angle relative to the conical surface 822, and therefore each of the beams 811 and 813 refracts as it enters the axicon 820. Each of the beams 811 and 813 propagates through the axicon 820 and exits the axicon 820 at the exit surface 823. Each of the exiting beams 811 and 813 is substantially parallel to the beam 812 at a common reference plane 830. Downstream from the reference plane 830, the principles of relay imaging described in FIG. 4 can be used in conjunction with the system 800.

Also shown in FIGS. 8A and 8B are two additional diode modules 804 and 805, and their respective beams 814 and 815, which propagate parallel to the beams 811 and 813, respectively. The beams 814 and 815 can pass through the axicon 820 and propagate parallel to the beams 811 and 813 toward the reference plane 830. But these beams are not productive in the context of the present disclosure, because their respective diode modules are too close to other diode modules, which is in contrast to the desire to ensure that the diode modules are spaced widely apart from each other.

It is important to recognize, however, that the axicon 820 is a three-dimensional object, and that the conical surface 822 extends completely around the axicon 820. This makes it possible for one or more additional modules (not shown) to be out-of-plane with respect to the modules 801-803. This allows for additional spacing between the additional modules. For example, two additional modules may be positioned in a plane above and parallel to the plane of FIG. 8A, and two more modules may be positioned in a plane below and parallel to the plane of FIG. 8A. Since the surface 822 is conical and extends out of the plane of FIG. 8A, optical beams can still be incident on the conical surface 822 at an appropriate angle, even when the generating module is not co-planar with the module 801. For example, the beams 816-819, shown in FIG. 8B can be generated by the additional modules that are out-of-plane with respect to FIG. 8A.

The beams 816-819 will follow paths analogous to the paths of the beams 811 and 813, and exit through the surface 823 propagating closely spaced with the beams 811-813 and parallel to the beams 811-813. This arrangement is displayed in the end view of FIG. 8B, which is how the beams would look at the reference plane 830. Viewing this arrangement of modules, beams, and axicon in a plane aligned along axis 841 in FIG. 8B will show the plane view indicated in FIG. 8A. According to this design, a plane aligned along axis 842 or axis 843 will show a plane view analogous to that of the plane aligned along axis 841, and these planes will include beams 816 and 819, and beams 817 and 818, respectively.

Figure 9B:
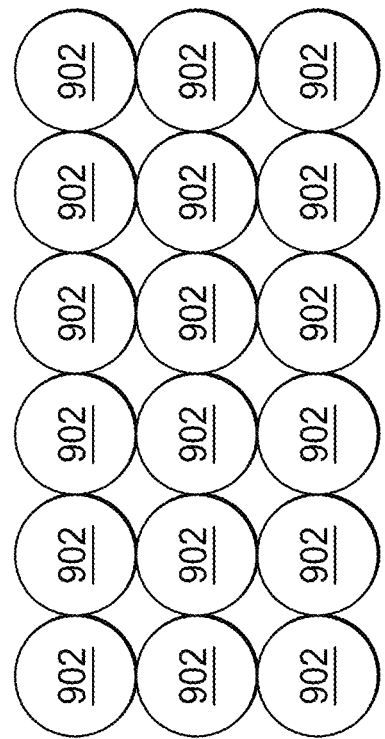
FIGS. 9A and 9B illustrate example two-dimensional arrangements of beams generated using embodiments of this disclosure.
Figure 9A:
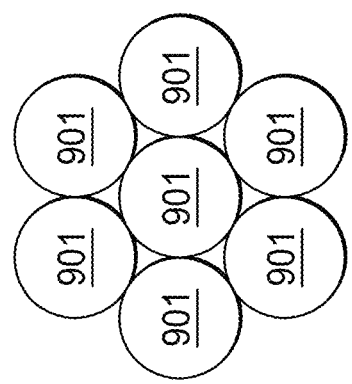

FIGS. 9A and 9B illustrate example 2-D arrangements of beams generated using embodiments of this disclosure. In FIG. 9A, multiple beams 901 are arranged in a compact close-packed circular bundle. The beams 901 shown in FIG. 9A can represent (or be represented by) the beams 811-813, 816-819 shown in FIG. 8B. In FIG. 9B, multiple beams 902 are arranged in a rectangular 2-D bundle. In some embodiments, each row of beams 902 in the bundle may be generated by a separate optical element, such as the prism 120 of FIG. 1. To generate the multiple rows of beams 902 in the bundle, multiple prisms 120 could be arranged in a row that is perpendicular to the plane of FIG. 1.

Although FIGS. 1 through 9B illustrate various examples of systems for high-brightness spatial beam combining of laser modules and related details, various changes may be made to FIGS. 1 through 9B. For example, the disclosed systems and their individual components may have any suitable sizes, shapes, and dimensions. Also, various components in the disclosed systems may be combined, further subdivided, replicated, rearranged, or omitted and additional components may be added according to particular needs.

It may be advantageous to set forth definitions of certain words and phrases used throughout this patent document. The terms "include" and "comprise," as well as derivatives thereof, mean inclusion without limitation. The term "or" is inclusive, meaning and/or. The term "substantially," when used with one or more other terms (e.g., "substantially parallel", "substantially equal", "substantially the same size", etc.) indicates a possible deviation from exact equivalence that is within an acceptable degree of tolerance or uncertainty of measurement. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," or "system" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
   at least three laser diode modules that are spatially separated, each laser diode module configured to generate an optical beam that propagates at a unique angle relative to optical beams generated by other laser diode modules; and
   an optical element having at least one entrance surface and at least one exit surface, the optical element configured to receive the optical beam generated by each laser diode module at the at least one entrance surface and output each optical beam through the at least one exit surface such that (i) the output optical beams are closely spaced, substantially the same size, and substantially parallel to each other at a common distance downstream from the optical element and (ii) the optical beams all share a common downstream image plane.

2. The system of claim 1, wherein the closely spaced, substantially the same size, and substantially parallel optical beams are spatially arranged in a two-dimensional array.

3. The system of claim 1, wherein the closely spaced, substantially the same size, and substantially parallel optical beams are spatially arranged in a one-dimensional array.

4. The system of claim 1, wherein the optical element is a prism.

5. The system of claim 1, wherein the optical element is an axicon.

6. The system of claim 1, wherein at least some of the optical beams are incident on the optical element at an angle relative to the at least one entrance surface, refract as the optical beams enter the optical element, and refract again as the optical beams exit the optical element.

7. The system of claim 1, further comprising:
   relay lenses configured to receive the optical beams after the optical beams exit the optical element and to reduce a size of the optical beams by a factor substantially equal to a ratio of focal lengths of the relay lenses.

8. The system of claim 1, wherein the optical element is configured to output the optical beams toward a pump aperture of a laser gain medium.

9. The system of claim 1, wherein the optical element is configured to output the optical beams toward a pump aperture of a nonlinear optical medium.

10. A system comprising:
    multiple laser diode modules that are spatially separated and configured to generate multiple optical beams that propagate at angles relative to each other; and
    a reflector having multiple reflective facets, the reflector configured to directly receive and reflect each of the optical beams at a corresponding one of the reflective facets such that the optical beams are closely spaced and substantially parallel to each other when reflected from the reflector.

11. The system of claim 10, wherein the reflector is configured to reflect the optical beams such that the optical beams have a substantially same size and a substantially same shape at a common distance downstream from the reflector.

12. The system of claim 10, wherein the reflective facets are arranged at angles relative to each other, the angles selected based on the angles between the laser diode modules.

13. The system of claim 10, further comprising:
    relay lenses configured to receive the optical beams after the optical beams are reflected from the reflector and reduce a size of the optical beams by a factor substantially equal to a ratio of focal lengths of the relay lenses.

14. The system of claim 10, wherein the reflector is configured to reflect the optical beams toward a pump aperture of a laser gain medium.

15. A method comprising:
    generating, using at least three laser diode modules, at least three optical beams, each optical beam generated by a different one of the laser diode modules and propagating at a unique angle relative to optical beams generated by other laser diode modules;
    receiving, at one or more entrance surfaces of an optical element, the optical beam generated by each laser diode module; and
    outputting each optical beam through at least one exit surface of the optical element such that (i) the output optical beams are closely spaced, substantially the same size, and substantially parallel to each other at a common distance downstream from the optical element and (ii) the optical beams all share a common downstream image plane.

16. The method of claim 15, wherein the closely spaced, substantially the same size, and substantially parallel optical beams are spatially arranged in a two-dimensional array.

17. The method of claim 15, wherein the closely spaced, substantially the same size, and substantially parallel optical beams are spatially arranged in a one-dimensional array.

18. The method of claim 15, wherein the optical element is a prism or an axicon.

19. The method of claim 15, further comprising:
    receiving the optical beams with relay lenses after the optical beams exit the optical element to reduce a size of the optical beams by a factor substantially equal to a ratio of focal lengths of the relay lenses.

20. The method of claim 15, wherein the optical element outputs the optical beams toward a pump aperture of a laser gain medium or a nonlinear optical medium.

* * * * *